(12) United States Patent
Koizumi et al.

(10) Patent No.: US 8,826,730 B2
(45) Date of Patent: Sep. 9, 2014

(54) METHOD OF DIAGNOSING REGENERATION FAILURE OF EXHAUST EMISSION CONTROL DEVICE

(75) Inventors: Wataru Koizumi, Tokyo (JP); Hironori Narita, Tokyo (JP); Jinichi Minamikawa, Tokyo (JP)

(73) Assignee: Hino Motors, Ltd., Tokyo (JP)

( * ) Notice: Subject to any disclaimer, the term of this patent is extended or adjusted under 35 U.S.C. 154(b) by 482 days.

(21) Appl. No.: 13/133,305

(22) PCT Filed: Dec. 9, 2009

(86) PCT No.: PCT/JP2009/006709
§ 371 (c)(1),
(2), (4) Date: Jun. 7, 2011

(87) PCT Pub. No.: WO2010/073511
PCT Pub. Date: Jul. 1, 2010

(65) Prior Publication Data
US 2011/0232364 A1    Sep. 29, 2011

(30) Foreign Application Priority Data

Dec. 24, 2008    (JP) ................................. 2008-327029

(51) Int. Cl.
*G01M 15/00*    (2006.01)
*B01D 53/94*    (2006.01)
(Continued)

(52) U.S. Cl.
CPC .......... *F02D 41/029* (2013.01); *B01D 53/9495* (2013.01); *F01N 2900/1406* (2013.01); *B01D 46/0063* (2013.01); *F01N 3/103* (2013.01); *B01D 2257/7022* (2013.01); *F01N 2013/026* (2013.01); *F02D 41/405* (2013.01); *F01N 3/106* (2013.01); *F02D 41/22* (2013.01); *F01N 3/023* (2013.01); *F02D 41/1446* (2013.01); *F01N 2900/0421* (2013.01); *F01N 11/00* (2013.01); *B01D 46/446* (2013.01); *F02D 41/1445* (2013.01); *B01D 46/42* (2013.01); *F01N 2900/0418* (2013.01); *Y02T 10/47* (2013.01); *B01D 53/944* (2013.01); *F02B 37/00* (2013.01); *F01N 2560/08* (2013.01); *B01D 46/0057* (2013.01); *F01N 9/002* (2013.01); *B01D 2279/30* (2013.01); *B01D 46/448* (2013.01); *F01N 2550/04* (2013.01); *F01N 11/002* (2013.01)
USPC ...................................................... 73/114.76

(58) Field of Classification Search
USPC .......................................................... 73/1.01
See application file for complete search history.

(56) References Cited

FOREIGN PATENT DOCUMENTS

| EP | 1 437 493 A1 | 7/2004 |
|---|---|---|
| FR | 2 836 957 | 9/2003 |

(Continued)

OTHER PUBLICATIONS

International Search Report issued Feb. 16, 2010 in PCT/JP09/06709 filed Dec. 9, 2009.

(Continued)

*Primary Examiner* — Robert R Raevis
(74) *Attorney, Agent, or Firm* — Oblon, Spivak, McClelland, Maier & Neustadt, L.L.P.

(57) ABSTRACT

Provided is a method of diagnosing regeneration failure of an exhaust emission control device including filter regenerating means for forcibly heating a particulate filter 13 so as to burn off captured particulates. An exhaust flow rate to the particulate filter 13 and a differential pressure between entry and exit sides of the particulate filter 13 are obtained to calculate a gradient of change in the differential pressure relative to change in the exhaust flow rate. The calculated gradient is compared with a predetermined reference gradient to diagnose the particulate filter 13 as having regeneration failure when the calculated gradient exceeds the reference gradient.

2 Claims, 3 Drawing Sheets

(51) Int. Cl.
*B01D 46/00* (2006.01)
*F02D 41/02* (2006.01)
*F01N 3/10* (2006.01)
*F01N 3/023* (2006.01)
*F01N 11/00* (2006.01)
*B01D 46/44* (2006.01)
*B01D 46/42* (2006.01)
*F01N 9/00* (2006.01)
*F01N 13/02* (2010.01)
*F02D 41/40* (2006.01)
*F02D 41/22* (2006.01)
*F02D 41/14* (2006.01)
*F02B 37/00* (2006.01)

(56) References Cited

FOREIGN PATENT DOCUMENTS

| JP | 2003 3829 | 1/2003 |
| JP | 2003 83139 | 3/2003 |
| JP | 2003 155913 | 5/2003 |
| JP | 2005 299476 | 10/2005 |
| JP | 2005299476 A * | 10/2005 |
| JP | 2007 23792 | 2/2007 |
| JP | 2007023792 A * | 2/2007 |
| JP | 2008-190431 A | 8/2008 |

OTHER PUBLICATIONS

Supplementary Search Report issued Oct. 1, 2013 in European Application No. 09 83 4326.

* cited by examiner

METHOD OF DIAGNOSING REGENERATION FAILURE OF EXHAUST EMISSION CONTROL DEVICE

TECHNICAL FIELD

The present invention relates to a method of diagnosing regeneration failure of an exhaust emission control device.

BACKGROUND ART

Particulates or particulate matter from a diesel engine is mainly constituted by carbonic soot and a soluble organic fraction (SOF) of high-boiling hydrocarbon and contains a trace of sulfate (misty sulfuric acid fraction). In order to reduce such kind of particulates, it has been carried out to incorporate a particulate filter in an exhaust pipe through which an exhaust gas flows.

Such kind of particulate filter has a porous honeycomb structure made of ceramics such as cordierite and having lattice-like compartmentalized passages; alternate ones of the passages have plugged inlets and the remaining passages with unplugged open inlets are plugged at outlets thereof. Thus, only the exhaust gas passing through thin porous compartment walls is discharged downstream.

The particulates in the exhaust gas, which are captured and accumulated on inner surfaces of the thin porous walls, require to be burned off for regeneration of the particulate filter before exhaust resistance increases due to clogging. However, the exhaust gas from the diesel engine in a normal engine operation status rarely has a chance to reach a temperature level at which the particulates ignite by themselves.

In order to overcome this, an oxidation catalyst comprising, for example, alumina carrying platinum and added with an appropriate amount of rare earth element such as cerium is integrally carried by a particulate filter. The oxidation catalyst facilitates an oxidation reaction of particulates captured by the particulate filter to lower the ignition temperature, so that the particulates may be burned off even at an exhaust temperature level lower than ever before.

However, even in such a case, a captured amount of the particulates may exceed a treated amount in an operation area having a lower exhaust temperature level. Continued operation at such lower exhaust temperature level may hinder sufficient regeneration of the particulate filter, resulting in excessive accumulation of the captured particulates in the particulate filter. Thus, when an amount of accumulated particulates has increased, it is necessary to forcibly heat the particulate filter by filter regenerating means so as to burn off the captured particulates.

Such filter regenerating means has been developed which is, for example, an oxidation catalyst disposed in front of the particulate filter with fuel being added upstream of the oxidation catalyst to perform heating by use of oxidation reaction heat on the oxidation catalyst, or heating means such as a burner or an electric heater disposed in front of the particulate filter.

Measures for forcibly regenerating such particulate filter are also dealt with in Patent Literatures 1 and 2 by the applicant of the present invention.

CITATION LIST

Patent Literature

[Patent Literature 1] JP 2003-83139A
[Patent Literature 2] JP 2003-155913A

SUMMARY OF INVENTION

Technical Problems

However, after the forcible regeneration of the particulate filter by the filter regenerating means as mentioned in the above is terminated as completed, there is conventionally no way of ascertaining whether the regeneration is actually normally completed or is completed with regeneration failure remaining. Thus, regeneration failure of the particulate filter cannot be applied to, for example, OBD (onboard diagnosis: an alarm system performing failure diagnosis of an exhaust gas countermeasure system for an automobile to notify a driver of having a failure and record a failure location and the like in case of failure).

The invention was made in view of the above and has its object to enable proper diagnosis to be performed against regeneration failure of a particulate filter after forcible regeneration of the particulate filter by filter regenerating means.

Solution to Problems

The invention provides a method of diagnosing regeneration failure of an exhaust emission control device including filter regenerating means for forcibly heating a particulate filter so as to burn off captured particulates, characterized in that an exhaust flow rate to the particulate filter and a differential pressure between entry and exit sides of the particulate filter are obtained to calculate a gradient of change in the differential pressure relative to change in the exhaust flow rate, the calculated gradient being compared with a predetermined reference gradient to diagnose the particulate filter as having regeneration failure when the calculated gradient exceeds the reference gradient.

Thus, even if momentarily the operation state varies and the exhaust flow rate fluctuates due to repeated acceleration/deceleration, the calculated gradient of change in the differential pressure relative to change in the exhaust flow rate does not change significantly unless airflow resistance of the particulate filter changes. Thus, by determining whether the calculated gradient exceeds the reference gradient or not through comparison of the gradients, it is determined how much particulates remain in the particulate filter.

Specifically, the particulates remaining in excess of an acceptable amount due to regeneration failure increases the airflow resistance of the particulate filter and increases the calculated gradient of change in the differential pressure relative to change in the exhaust flow rate. Thus, from the fact that the calculated gradient exceeds the reference gradient, it is determined that the particulate filter has regeneration failure.

Naturally, the reference gradient is properly set or defined as gradient of change in the differential pressure relative to change in the exhaust flow rate with the particulates remaining in an unacceptable amount after the regeneration of the particulate filter.

It is preferable in the invention that diagnosis of regeneration failure of the particulate filter is performed only when the exhaust flow rate exceeds a predetermined flow rate, which avoids the diagnosis under a condition of a lower exhaust flow rate where fluctuant results tend to be caused in calculation of a gradient of change in the differential pressure relative to change in the exhaust flow rate.

Further, it is preferable in the invention that the particulate filter is diagnosed as having regeneration failure when a frequency of the calculated gradient exceeding the reference gradient becomes greater than a predetermined frequency, which eliminates false diagnosis of temporary regeneration failure due to abrupt disturbance in, for example, a transient state of acceleration/deceleration.

It is preferable in the invention that an intake air amount to an engine, a fuel injection amount and an exhaust temperature are detected, and the intake air amount and a vaporized gas amount of fuel are converted in terms of temperature on the basis of the exhaust temperature to calculate the exhaust flow rate to the particulate filter, which enables the exhaust flow rate to be relatively easily obtained only with an arithmetic process by using the intake air amount to the engine, the fuel injection amount and the exhaust temperature already detected for various controls.

Advantageous Effects of Invention

According to the method of diagnosing regeneration failure of an exhaust emission control device of the invention as mentioned above, excellent effects can be achieved as follows.

(I) The regeneration failure of the particulate filter can be properly diagnosed in a continuously changing operation state, so that, after the filter regenerating means forcibly heats the particulate filter so as to burn off the captured particulates, it can be ascertained whether the regeneration is actually normally completed or is completed with regeneration failure remaining.

(II) If the diagnosis of regeneration failure of the particulate filter is performed only when the exhaust flow rate exceeds a predetermined flow rate, the diagnosis can be avoided under a condition of a lower exhaust flow rate where fluctuant results tend to be caused in calculation of a gradient of change in the differential pressure relative to change in the exhaust flow rate, which can substantially improve the accuracy in the diagnosis of regeneration failure of the particulate filter.

(III) If the particulate filter is diagnosed as having the regeneration failure when the frequency of the calculated gradient exceeding the reference gradient becomes greater than the predetermined frequency, false diagnosis of temporary regeneration failure due to abrupt disturbance in, for example, a transient state of acceleration/deceleration can be eliminated, which can further improve the accuracy in the diagnosis of regeneration failure of the particulate filter.

(IV) If the intake air amount to the engine, the fuel injection amount and the exhaust temperature are detected and the intake air amount and the vaporized gas amount of fuel are converted in terms of temperature on the basis of the exhaust temperature to calculate the exhaust flow rate to the particulate filter, the exhaust flow rate can be relatively easily obtained only with an arithmetic process by using the intake air amount to the engine, the fuel injection amount and the exhaust temperature already detected for various controls, which makes it possible to detect the exhaust flow rate without requiring additional equipment cost.

DESCRIPTION OF EMBODIMENT

An embodiment of the invention will be described with reference to the drawings.

Figure 1:
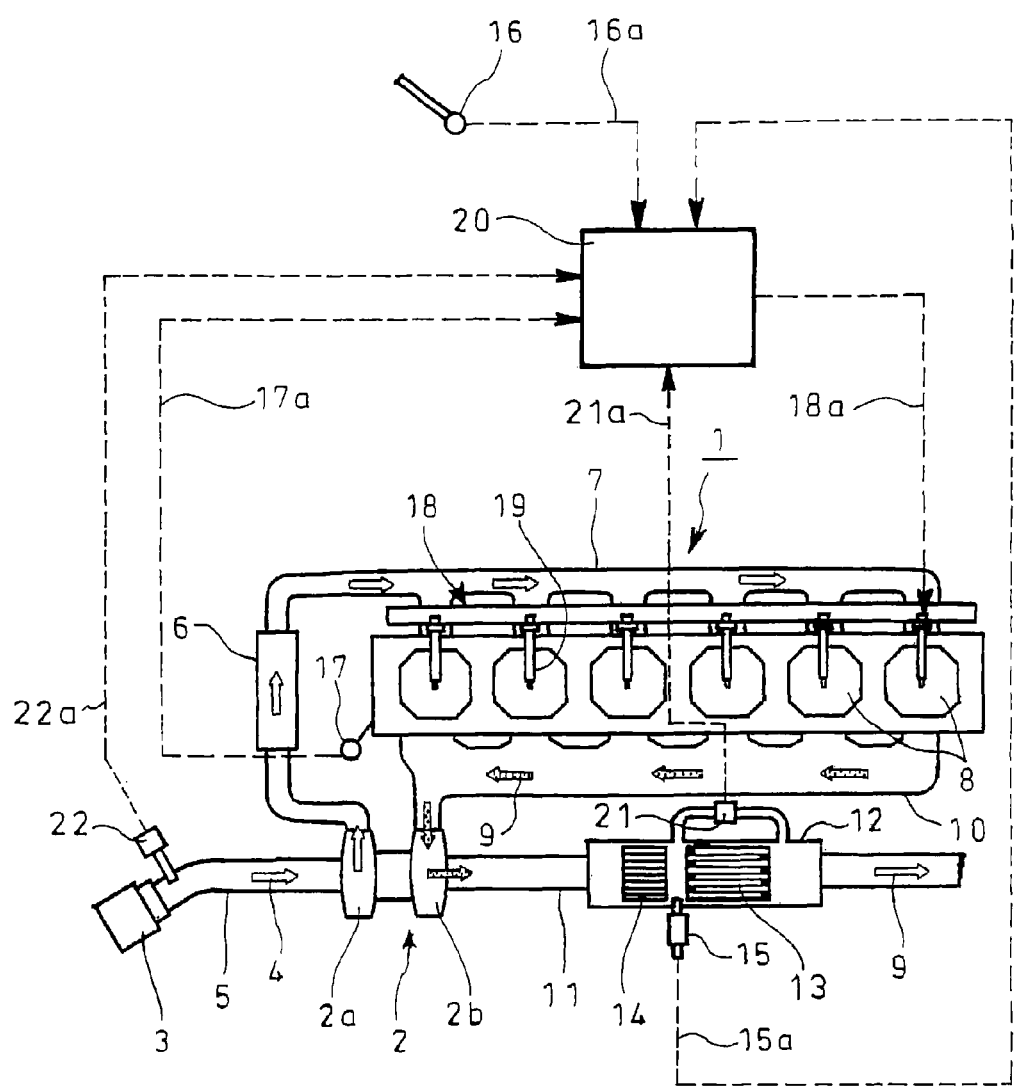
FIG. 1 is a schematic view showing an embodiment of the invention.
Figure 2:
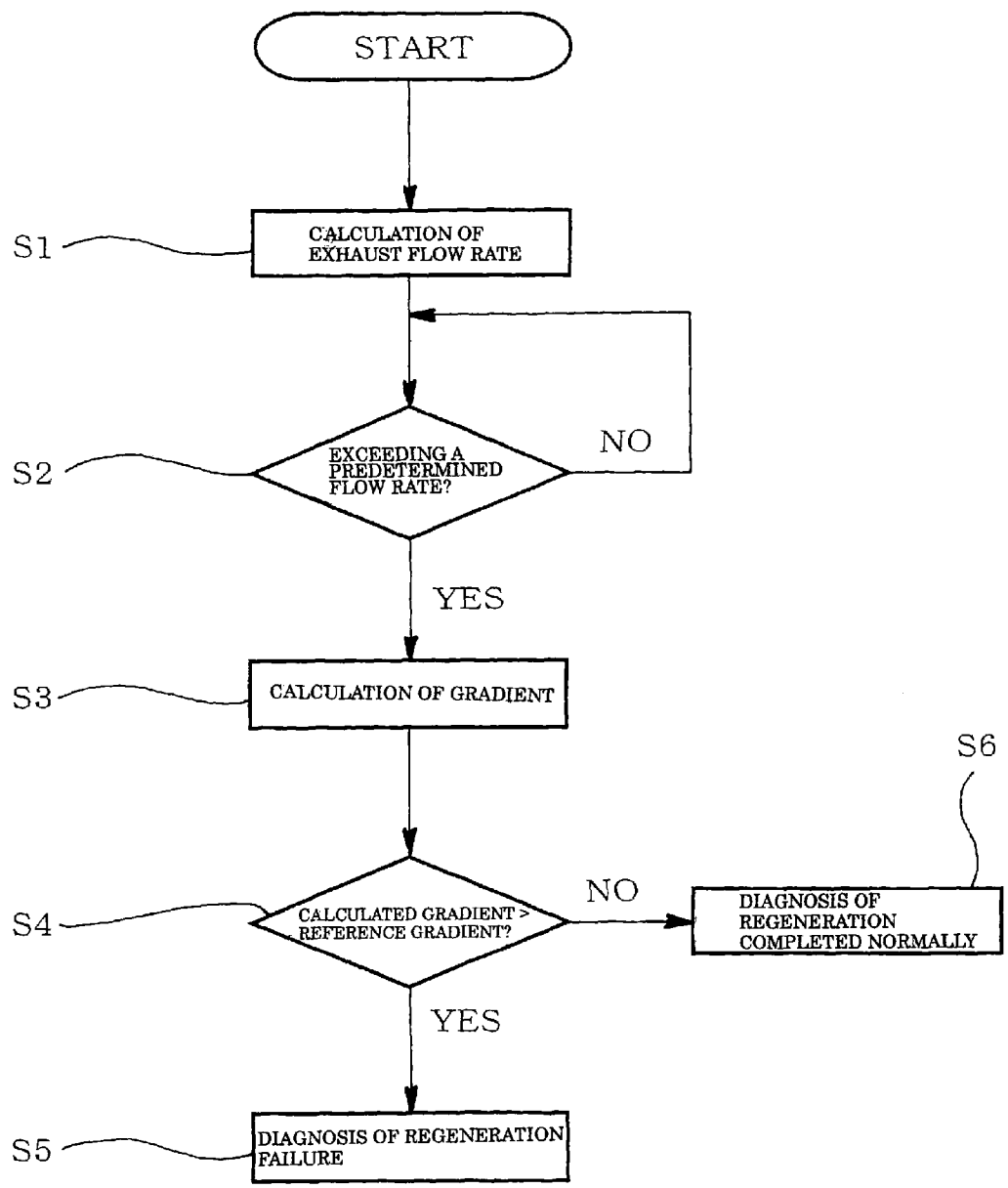
FIG. 2 is a flowchart of a specific diagnosis procedure by a controller shown in FIG. 1.
Figure 3:
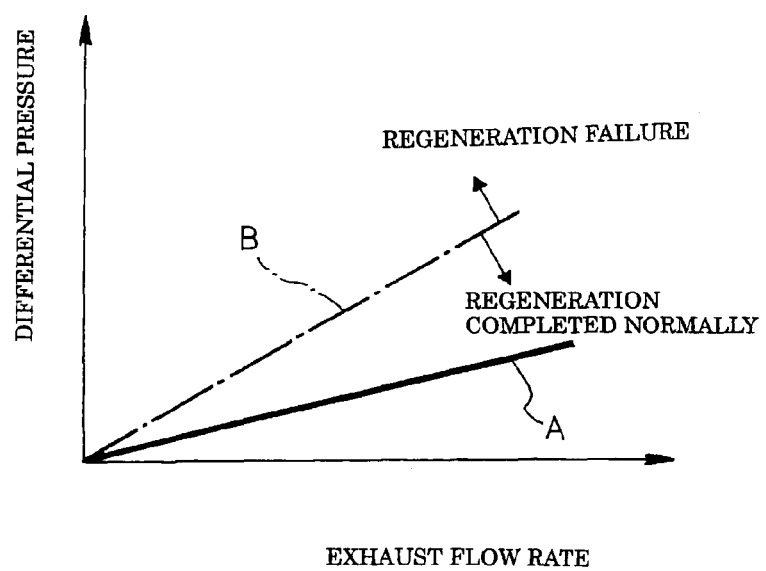
FIG. 3 is a graph comparing a gradient of change in the differential pressure relative to change in the exhaust flow rate with a reference gradient.

FIGS. 1 to 3 show the embodiment of the invention. In FIG. 1, reference numeral 1 denotes a diesel engine equipped with a turbocharger 2. Intake air 4 introduced from an air cleaner 3 is led through an intake pipe 5 to a compressor 2a of the turbocharger 2. The intake air 4 pressurized by the compressor 2a is led to an intercooler 6 where it is cooled. The intake air 4 is further led from the intercooler 6 to an intake manifold 7 and is distributed to cylinders 8 of the engine 1 (exemplarily illustrated in FIG. 1 is a case with inline six cylinders).

Further, an exhaust gas 9 is discharged from the cylinders 8 of the diesel engine 1 and is led via an exhaust manifold 10 to a turbine 2b of the turbocharger 2. The exhaust gas 9 having driven the turbine 2b is discharged outside of a vehicle via an exhaust pipe 11.

Incorporated in the exhaust pipe 11 is a filter casting 12. Housed in the filter casing 12 at a rear portion thereof is a catalyst regeneration type particulate filter 13 which integrally supports an oxidation catalyst. The particulate filter 13 has a porous honeycomb structure made of ceramics and having lattice-like compartmentalized passages; alternate ones of the passages have plugged inlets and the remaining passages with unplugged open inlets are plugged at outlets thereof. Thus, only the exhaust gas 9 passing through thin porous compartment walls is discharged downstream.

Housed in the filter casting 12 just in front of the particulate filter 13 is a flow-through type oxidation catalyst 14 having a honeycomb structure. The filter casing 12 is equipped with a temperature sensor 15 between the catalyst 14 and the filter 13 to measure a temperature of the exhaust gas 9 and is connected via pressure takeoff pipes to a differential pressure sensor 21 (differential pressure measuring device) which measures a differential pressure between before and after the particulate filter 13. A temperature signal 15a and a differential pressure signal 21a from the sensors 15 and 21, respectively, are input to a controller 20 which makes up an engine control computer (ECU: Electronic Control Unit).

The intake pipe 5 is equipped, immediately after the air cleaner 3, with an airflow meter 22 which measures an intake air amount. A flow rate signal 22a of the airflow meter 22 is also input to the controller 20.

The controller 20, which also acts as engine control computer, is responsible also for control in relation to fuel injection. More specifically, on the basis of an accelerator opening degree signal 16a from an accelerator sensor 16 (load sensor) which detects an accelerator opening degree as a load of the engine 1 and a rotation speed signal 17a from a rotation sensor 17 which detects an engine rotation speed of the engine 1, a fuel injection signal 18a is output to a fuel injection device 18 which injects fuel to the cylinders 8 of the engine 1.

The fuel injection device 18 comprises a plurality of injectors 19 each for each cylinder 8. Electromagnetic valves of the respective injectors 19 are appropriately controlled in opening degree by the fuel injection signal 18a such that the fuel injection timing (valve opening timing) and the injection amount (valve opening period) are properly controlled.

When the particulate filter 13 is required to be regenerated, the controller 20 determines the fuel injection signal 18a such that a main fuel injection near a compression top dead center (crank angle 0°) is followed by a post injection at non-ignition timing after the compression upper dead center.

Specifically, with the fuel injection device 18 having received the fuel injection signal 18a, the main injection is followed by the post injection at the non-ignition timing after the compression top dead center, which adds unburned fuel (mainly, HC: hydrocarbon) into the exhaust gas 9. The unburned fuel undergoes an oxidation reaction on the oxidation catalyst 14 in front of the filter; and heat of the reaction increases a catalyst bed temperature so as to burn off the particulates in the particulate filter 13.

In short, the filter regenerating means employed in the illustrated embodiment is such that disposed in front of the particulate filter 13 is the oxidation catalyst 14, fuel being added upstream thereof through the post injection by the fuel injection device 18 to heat the particulate filter 13 by the oxidation reaction heat on the oxidation catalyst 14.

The controller 20 determines as completed and terminates the forcible regeneration through the filter regenerating means when the exhaust temperature detected by the temperature sensor 15 on the entry side of the particulate filter 13 continues at or above a predetermined temperature for a predetermined time. Whether the regeneration of the particulate filter 13 is actually normally completed or is completed with regeneration failure remaining is ascertained as described below.

As shown in FIG. 2 as flowchart, an exhaust flow rate is obtained at step S1 by summing an intake air amount gotten from the flow rate signal 22a of the engine 1 from the airflow meter 22 and a vaporized gas amount converted from a fuel injection amount grasped upon fuel injection control to the fuel injection device 18 and converting the sum in terms of temperature on the basis of an exhaust temperature gotten from the temperature signal 15a of the sensor 15. At next step S2, it is determined whether the exhaust flow rate obtained at step S1 exceeds a predetermined flow rate or not; and only when exceeding, the procedure goes to step S3.

At step S3, a differential pressure between entry and exit sides of the particulate filter 13 is obtained on the basis of the differential pressure signal 21a from the sensor 21 to calculate a gradient (indicated by A in FIG. 3) of change in the differential pressure relative to change in the exhaust flow rate as shown in a graph of FIG. 3. The gradient in this case is obtained by calculating average values per unit time of the order of, e.g., five to ten seconds for both the exhaust flow rate and the differential pressure.

At next step S4, the gradient obtained by calculation at step S3 is compared with a predetermined reference gradient (indicated by B in FIG. 3) to determine whether the calculated gradient exceeds the reference gradient or not; only when a frequency of the calculated gradient exceeding the reference gradient becomes greater than a predetermined frequency, the determination of "YES" is made and the procedure goes to step S5 to diagnose that the particulate filter 13 has regeneration failure, while the procedure goes to step S6 in the case of "NO" to diagnose that the regeneration of the particulate filter 13 is completed normally.

The determination of "YES" at step S4 may be made by considering that the frequency of exceeding becomes greater than the predetermined frequency if the calculated gradient is determined as exceeding the reference gradient about five times out of ten, for example.

Thus, even if momentarily the operation state varies and the exhaust flow rate fluctuates due to repeated acceleration/deceleration, the calculated gradient of change in the differential pressure relative to change in the exhaust flow rate does not change significantly unless the airflow resistance of the particulate filter 13 changes. Thus, by determining whether the calculated gradient exceeds the reference gradient or not through comparison of the gradients, it is determined how much particulates remain in the particulate filter 13.

Specifically, the particulates remaining in excess of an acceptable amount due to regeneration failure increases the airflow resistance of the particulate filter 13 and increases the calculated gradient of change in the differential pressure relative to change in the exhaust flow rate. Thus, from the fact that the calculated gradient exceeds the reference gradient, it is determined that the particulate filter 13 has regeneration failure.

Naturally, the reference gradient is properly set or defined as gradient of change in the differential pressure relative to change in the exhaust flow rate with the particulates remaining in an unacceptable amount after the regeneration of the particulate filter 13.

Thus, according to the embodiment, the regeneration failure of the particulate filter 13 can be properly diagnosed in the continuously changing operation state, so that, after the filter regenerating means forcibly heats the particulate filter 13 so as to burn off the captured particulates, it can be ascertained whether the regeneration of the particulate filter is actually normally completed or is completed with regeneration failure remaining.

Particularly in the embodiment, the diagnosis of the regeneration failure of the particulate filter 13 is performed only when the exhaust flow rate exceeds a predetermined flow rate, which can avoid the diagnosis under a condition of a lower exhaust flow rate where fluctuant results tend to be caused in calculation of a gradient of change in the differential pressure relative to change in the exhaust flow rate. As a result, the accuracy can be substantially improved in the diagnosis of regeneration failure of the particulate filter 13.

Since the particulate filter 13 is diagnosed as having the regeneration failure when the frequency of the calculated gradient exceeding the reference gradient becomes greater than the predetermined frequency, false diagnosis of temporary regeneration failure due to abrupt disturbance in, for example, a transient state of acceleration/deceleration can be eliminated so that the accuracy can be further improved in the diagnosis of regeneration failure of the particulate filter 13.

Since the intake air amount to the engine 1, the fuel injection amount and the exhaust temperature are detected and the intake air amount and the vaporized gas amount of fuel are converted in terms of temperature on the basis of the exhaust temperature to calculate the exhaust flow rate to the particulate filter 13, the exhaust flow rate can be relatively easily obtained only with an arithmetic process by using the intake air amount to the engine 1, the fuel injection amount and the exhaust temperature already detected for various controls, so that the exhaust flow rate can be detected without requiring additional equipment cost.

It is to be understood that a method of diagnosing regeneration failure of an exhaust emission control device of the invention is not limited to the above embodiment and that various changes and modifications may be made without departing from the scope of the invention. For example, the filter regenerating means may be of any type as long as the particulate filter is forcibly heated so as to burn off the captured particulates; it may be of a type having a burner or an electric heater disposed in front of the particulate filter.

REFERENCE SIGNS LIST 1 diesel engine
9 exhaust gas
11 exhaust pipe
13 particulate filter
14 oxidation catalyst (filter regenerating means)
15 temperature sensor
18 fuel injecting device (filter regenerating means)
20 controller
21 differential pressure sensor
22 airflow meter

The invention claimed is:

1. A method of diagnosing regeneration failure of an exhaust emission control device including filter regenerating means for forcibly heating a particulate filter so as to burn off captured particulates, the method comprising:

obtaining an exhaust flow rate to the particulate filter and a differential pressure between entry and exit sides of the particulate filter to calculate a gradient of change in the differential pressure relative to change in the exhaust flow rate, the calculated gradient being compared with a predetermined reference gradient to diagnose the particulate filter as having regeneration failure when the calculated gradient exceeds the reference gradient, wherein the diagnosis of regeneration failure of the particulate filter is performed only when the exhaust flow rate exceeds a predetermined flow rate, and wherein the particulate filter is diagnosed as having regeneration failure when a frequency of the calculated gradient exceeding the reference gradient becomes greater than a predetermined frequency.

2. The method of diagnosing regeneration failure of an exhaust emission control device as claimed in claim 1, wherein an intake air amount to an engine, a fuel injection amount and an exhaust temperature are detected, and the intake air amount and a vaporized gas amount of fuel are converted in terms of temperature on the basis of the exhaust temperature to calculate the exhaust flow rate to the particulate filter.

* * * * *